Sept. 24, 1963 R. H. NORMAN 3,105,157

SHIFTING REGISTER HAVING IMPROVED INFORMATION TRANSFORMING MEANS

Filed Feb. 2, 1959 3 Sheets-Sheet 1

INVENTOR
ROBERT H. NORMAN
BY Henry Huff
ATTORNEY

INVENTOR
ROBERT H. NORMAN
BY
Henry Huff
ATTORNEY

Sept. 24, 1963 R. H. NORMAN 3,105,157

SHIFTING REGISTER HAVING IMPROVED INFORMATION TRANSFORMING MEANS

Filed Feb. 2, 1959 3 Sheets-Sheet 3

INVENTOR
ROBERT H. NORMAN
BY Henry Huff
ATTORNEY

United States Patent Office 3,105,157
Patented Sept. 24, 1963

3,105,157

SHIFTING REGISTER HAVING IMPROVED INFORMATION TRANSFERRING MEANS

Robert H. Norman, Glen Oaks, N.Y., assignor to Sperry Rand Corporation, Great Neck, N.Y., a corporation of Delaware Filed Feb. 2, 1959, Ser. No. 790,592
3 Claims. (Cl. 307—88.5)

This invention relates to a shifting register and more particularly relates to an improved method for transferring stored information between stages in a device of this type.

A shifting register is a device which is capable of storing information in the form of binary characters, for example, and which is also capable of shifting the position of the characters one or more digit places to the left or right.

Shifting registers are commonly employed in digital computers which perform multiplication operation on binary numbers. The binary multiplication process may be accomplished in several different ways. In one of these ways, the product is obtained by progressively adding the multiplicand to a previously obtained partial product and then shifting the partial product one digit position to the right if the multiplier digit is a binary one, or not adding the multiplicand and shifting to the right one position if the multiplier digit is a binary zero. This process is well known to those skilled in the art and will not be further described. In this process it is necessary to sense the multiplier a digit at a time in order to determine whether or not to add the multiplicand to the partial product. A shifting register may be employed to accomplish this purpose.

A number of different shifting register circuits have been developed. One known type of shifting register is called a gated shifting register and is comprised of a plurality of bistable storage elements, such as flip-flops. Each side of a flip-flop is coupled to a respective input terminal of the succeeding flip-flop by means of an and-gate. The output signals of each flip-flop stage sets the and-gates for the next succeeding stage, which determines the state to which the succeeding stage will switch upon the application of the next shift pulse to each of the and-gates. Another type of shifting register is comprised of two series of flip-flop stages. The flip-flops of one series serve merely as intermediate storage devices between the flip-flops of the other series. The two series of flip-flops are sometimes called "master" and "slave" ranks. The above-described circuits are illustrated and described on pages 144–146 in "Arithmetic Operations In Digital Computers," by R. K. Richards, published by D. Van Nostrand Company, 1955. Each of these shifting registers require relatively more circuitry and are more complex than the circuit of the present invention. The first of the above-mentioned circuits requires two and-gates and two delay means between stages, and the second mentioned circuit requires two and-gates and a flip-flop between stages, as well as four-control lines and the associated complex control pulse generating means to control the operation of the device.

It is therefore an object of this invention to provide a shifting register which employs relatively simple circuitry.

Another object of this invention is to provide a shifting register which is extremely reliable in its operation.

A further object of this invention is to provide a simple shifting register which requires but a single control line to control its operation.

Another object of this invention is to provide simple and reliable means for shifting information between stages of a shifting register.

Other objects and a fuller understanding of the invention may be had by referring to the following description and claims, taken in conjunction with the accompanying drawings in which—

Figure 1:
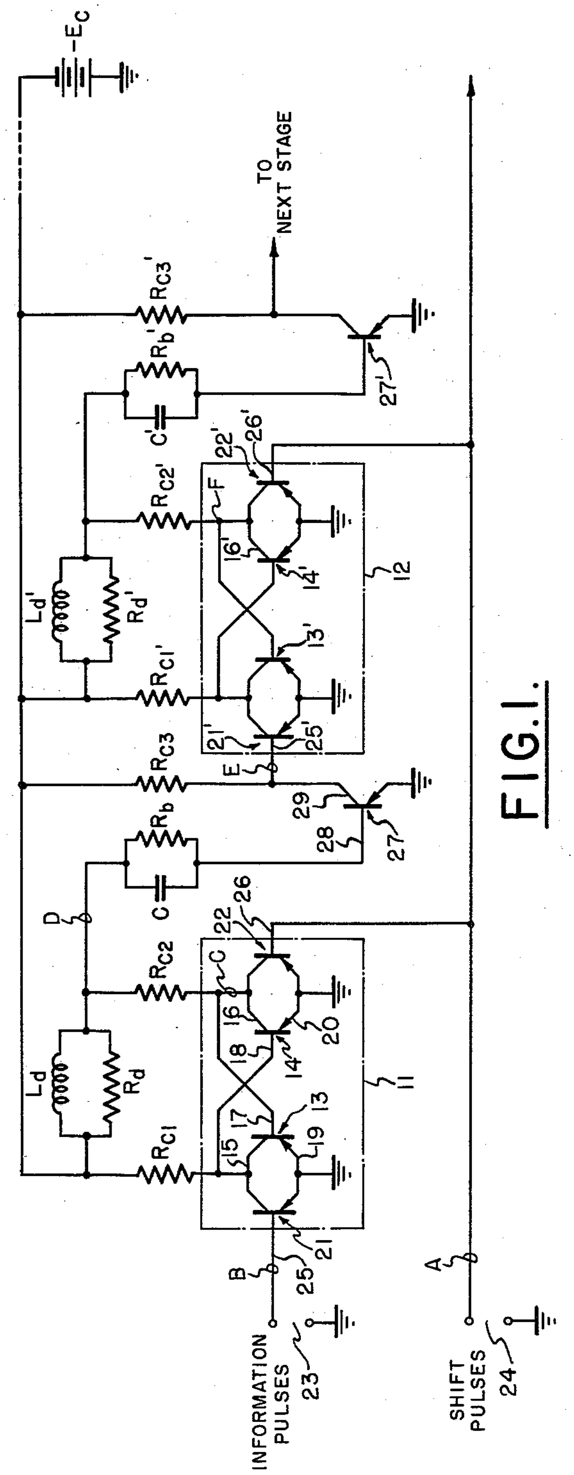
FIG. 1 is a schematic circuit diagram of one embodiment of the present invention.

Referring now more particularly to FIG. 1, there is illustrated therein a transistorized version of an embodiment of the present invention which is comprised of a plurality of bistable storage elements in the form of flip-flop devices 11 and 12. For convenience of illustration, only two stages of storage elements have been illustrated, it being understood that additional identical stages, depending upon the number of binary digits to be stored, may be cascaded to the two stages illustrated.

Bistable storage element 11 is comprised of PNP type transistors 13 and 14 whose respective collector electrodes 15 and 16 are directly cross-coupled to the respective base electrodes 18 and 17 of the opposite transistor. Emitter electrodes 19 and 20 are each coupled directly to ground. Transistors 21 and 22 are input transistors which are parallel coupled to the respective transistors 13 and 14 thus providing nor-gate type triggering for each side of the flip-flop, in the well known manner. Input terminal pairs 23 and 24 couple input information pulses and shifting pulses to base electrodes 25 and 26, respectively, of transistors 21 and 22.

The collectors of transistors 13 and 21 are coupled through a resistor $R_{c1}$ to a source of negative potential $-E_c$, and the collectors of transistors 14 and 22 are coupled through a resistor $R_{c2}$, parallel coupled inductance $L_d$ and resistor $R_d$, to the source of negative potential $-E_c$. The parallel combination of inductance $L_d$ and resistance $R_d$ comprises a differentiating network, as will be explained more fully below.

Bistable storage element 12 and differentiating network $L_d'$, $R_d'$ are identical to storage element 11 and differentiating network $L_d$, $R_d$, and the corresponding components thereof are designated by corresponding primed numerals.

The connection between storage elements 11 and 12 is provided by parallel connected resistor $R_b$ and condenser C, and transistor 27. Resistor $R_b$ and condenser C are coupled between the junction of resistor $R_{c2}$ and differentiating network $L_d$, $R_d$ and the base 28 of transistor 27. Resistor $R_b$ is a dropping resistor which permits enough base current to flow through the base-emitter diode of transistor 27 to maintain transistor 27 normally in the conducting state. Condenser C provides a low impedance path for A.C. signals. Transistor 27 functions as a single-input gate and produces a negative output pulse only when a positive pulse is applied to its base 28, as will be more fully explained.

Collector 29 of transistor 27 is coupled through resistor $R_{c3}$ to the source of negative potential $-E_c$, and is also coupled to base 25' of transistor 21' of bistable storage element 12. Base 26' of transistor 22' is coupled to input terminal 24 and receives shifting pulses therefrom.

The parallel coupled resistor $R_b'$ and condenser C', as well as transistor 27', comprise coupling means between bistable storage element 12 and the succeeding stage, and are identical to the correspondingly designated components between the first and second stages 11 and 12.

In the discussion which follows it is assumed that a conducting transistor is operating in the region of saturation, and when so operating its collector voltage is very near ground potential. When the potential on the base of a transistor is very near ground potential, that transistor will be cut off. Also, the following discussion employs the terms "positive pulse" and "negative pulse." These terms are used to identify pulses which rise or fall in the respective positive-going or negative-going directions, regardless of their absolute values.

It will be assumed in this discussion that an information pulse represents a binary one in a digit position of a binary number and that the absence of a pulse in a digit position represents a binary zero. It will be further assumed that the shifting pulses received at one input terminal pair occur simultaneously with the occurrence of the binary digits at the other input terminal pair, although it is to be understood that this condition is not necessary for the successful operation of the device of this invention.

Figure 2:
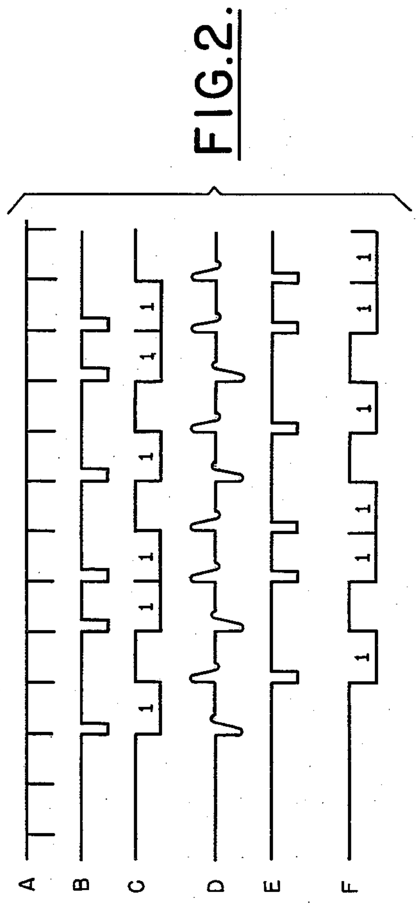
FIG. 2 is a series of waveforms used to help explain the operation of the circuit of FIG. 1.

In the operation of the shifting register of FIG. 1 all flip-flops are initially set in their first stable state by some means not shown. The first pulse of a series of negative shifting pulses, FIG. 2A, is received on input terminal pair 24 from a source, not shown, and is coupled to base 26 of transistor 22 causing that transistor to conduct. Conduction through transistor 22 causes the collector potential of transistors 14 and 22 to be very near ground potential, FIG. 2C, and because of the direct coupling to base 17 of transistor 13, the potential at base 13 is very near ground potential, causing transistor 13 to cut off. The potential at the collector 15 of transistor 13 will therefore be a negative potential. Because base 18 of transistor 14 is directly coupled to collector 15 of transistor 13, transistor 14 will be held in the conducting state. This is the first stable state of storage element 11, and indicates the storage of a binary zero.

The coupling of the second negative shifting pulse, FIG. 2A, to base 26 of transistor 22 has no effect on the condition of bistable storage element 11 since transistor 14 is already in the conducting state. There is therefore no change in the collector potential of transistor 14, FIG. 2C, and storage element 11 again stores a binary zero.

Simultaneously with the occurrence of the third shifting pulse, FIG. 2A, on input terminal pair 24, an information pulse is received on input terminal pair 23, FIG. 2B, indicating a binary one in this digit position. The information pulses of FIG. 2B are longer in duration than the shifting pulses of FIG. 2A, but are shorter in duration than the interval between any two successive shifting pulses. The first information pulse and the third shifting pulse are coupled, respectively, to bases 25 and 26 of transistors 21 and 22 and cause the transistors to conduct. Because of the longer duration of the information pulse it will have an overriding effect and will cause the transistor 13 to conduct and will cause transistor 14 to cut off, in accordance with the normal operation of a flip-flop circuit. When transistor 14 ceases conduction its collector potential will fall substantially to a negative potential, FIG. 2C. Storage element 11 will remain in this conduction state, its second stable state indicating the storage of a binary one, until the occurrence of the fourth shifting pulse, FIG. 2A. Because no information pulse occurs at that time, a binary zero is present at input terminal pair 23, the fourth shifting pulse coupled to base 26 of transistor 22 causes the bistable storage element 11 to transfer to its first stable state wherein transistor 14 is conducting, FIG. 2C, and transistor 13 is cut off.

The abrupt changes of transistor 14 from the conducting to the non-conducting, and then back to the conducting state, FIG. 2C, cause surges of current to flow through the differentiating network comprised of the parallel combination of inductance $L_d$ and resistance $R_d$, since this network is in series in the conduction path from source $-E_c$, through transistors 14 and 22, to ground.

Differentiating network $L_d$, $R_d$, operates in the well known manner to produce narrow pulses corresponding, respectively, to the leading and trailing edges of the voltage waveform at collector 22, FIG. 2C. The output voltage waveform of the differentiating network is illustrated in FIG. 2D. It may be seen that each time storage element 11 transfers from its second stable state to its first stable state a positive pulse is produced. The first positive pulse of waveform 2D is coupled through coupling condenser C to base 28 of transistor 27. Resistor $R_b$, in parallel with condenser C, is a dropping resistor which allows transistor 27 to be normally conducting. The positive pulse to base 28 cuts off transistor 27 and causes its collector voltage to go negative, FIG. 2E, for the duration of the positive pulse applied to its base 28. The positive pulses of waveform 2D must be longer in duration than a shifting pulse, and must be shorter in duration than the interval between two successive shifting pulses as will immediately become apparent.

The first negative output pulse of transistor 27, FIG. 2E, is coupled to base 25′ of transistor 21′ in the second bistable storage element 12. The fourth shifting pulse, FIG. 2A, occurs simultaneously with the first negative output pulse of transistor 27, and is coupled to base 26′ of transistor 22′ in bistable storage element 12. The input pulse to base 25′ of transistor 21′ amounts to a newly generated information pulse which is applied to bistable storage element 12, and in the manner previously described, has an overriding effect over the shifting pulse applied to base 26′, and causes bistable storage element 12 to transfer to its second stable state, FIG. 2F.

It is thus seen that the first binary one which was stored in the first bistable storage element 11 has been shifted to the second bistable storage element 12, FIG. 2F, and the first bistable storage element has transferred back to its first stable state, FIG. 2C, since the next binary digit is a zero (absence of negative pulse).

The second information pulse (binary one) of FIG. 2B is received on input terminal pair 23, is coupled to base 25 of transistor 21, and in the manner previously explained, has an overriding effect over the fifth shifting pulse of FIG. 2A which is coupled simultaneously to base 26 of transistor 22, thus causing bistable storage element 11 to transfer to its second stable state, wherein transistor 13 is conducting and transistor 14 is cut off, FIG. 2C. Bistable storage element 11 will remain in its second stable state until the sixth shifting pulse of waveform 2A is coupled from input terminal pair 24 to base electrode 26 of transistor 22. Bistable storage element 11 will then attempt to transfer back to its first stable state, but because the third information pulse, FIG. 2B, occurs simultaneously with the sixth shifting pulse and has an overriding effect, bistable storage element 11 will immediately revert back to its second stable state, FIG. 2C, and will remain in this state until it transfers back to its first stable state upon the application of the seventh shifting pulse of waveform 2A to base 26 of transistor 22, since no information pulse (a binary zero) at base 25 of transistor 21 is present at that time.

Parallel coupled inductance $L_d$ and resistance $R_d$ operate to differentiate the voltage waveform which result from the change in conduction states of transistors 14 and 22, and thus produce the second and third positive pulses of voltage waveform 2D. These positive pulses are coupled through coupling condenser C to the base 28 of normally conducting transistor 27. Each of these positive pulses causes transistor 27 to cut off and the second and third negative pulses of waveform 2E are produced at collector 29.

The second and third negative pulses of waveform 2E, newly generated information pulses (binary ones), are coupled from the collector 29 of transistor 27 to the base 25′ of transistor 21′ in bistable storage element 12, and in a manner identical with the operation of bistable storage element 11 previously described, cause bistable storage element 12 to produce the second and third adjacent negative pulses of waveform 2F at the collector 16′ of transistor 14′.

Comparison of waveforms 2B, 2C, 2E and 2F will show that the second and third information pulses (binary ones) have been successively stored in storage element 11 and then transferred to storage element 12.

The information previously stored in bistable storage element 12 will be shifted to a next succeeding identical stage, or to a utilization device, in the same manner that it was transferred from the first stage 11.

Upon reviewing the operation of the shifting register of FIG. 1 it will be realized that a binary one is shifted from the first bistable storage element 11 to the second element 12 only when the first element transfers from its second stable state to its first stable state. It may therefore be said of the shifting register of this invention that it shifts only binary ones, and not binary zeros, from one storage element to the next succeeding storage element. This is accomplished by means of differentiating network $L_d$, $R_d$, and a single-input gating means comprised of transistor 27. Taken together, differentiating network $L_d$, $R_d$ and transistor 27 may be called pulse generating means for generating binary ones in response to the change in state of a storage element from its "one" state to its "zero" state.

This mode of operation may be contrasted with the mode of operation of the prior art shifting registers referred to above wherein they operate by "sensing," by means of delay means and and-gates, or by storage in a "slave" rank of storage elements, the previous state of a storage element and then transferring a signal, representing either a binary one or a binary zero to the succeeding storage element.

Figure 3:
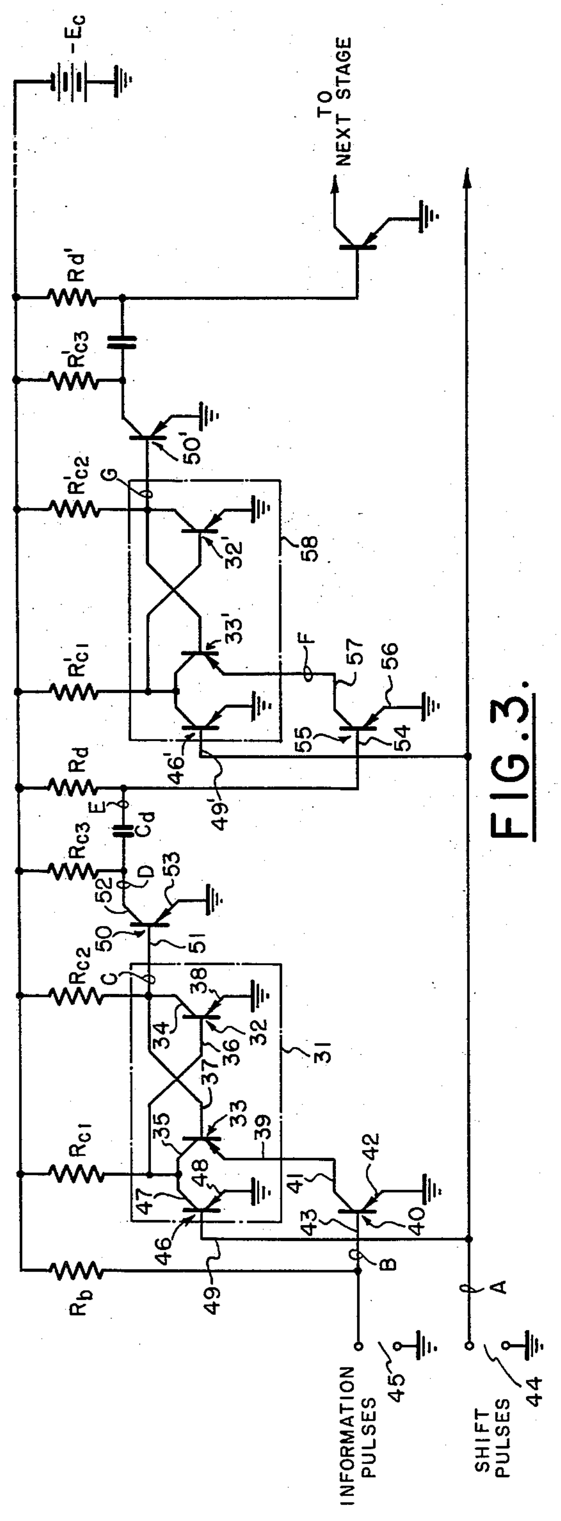
FIG. 3 is a schematic circuit diagram of another embodiment of the present invention.

FIG. 3 illustrates another embodiment of the present invention which is quite similar to the embodiment of FIG. 1 except for the form of the differentiating network, and the type of input circuit employed in the bistable storage elements. With the type of input circuit in the storage elements illustrated in FIG. 3, this shifting register may operate with input information pulses of a positive polarity, although this is merely an optional feature.

In FIG. 3 the first bistable storage element 31 is comprised of PNP type transistors 32, 33 whose collectors 34, 35 are directly cross-coupled, respectively, to the bases 37, 36 of the opposite transistor, in the usual manner. Emitter 38 of transistor 32 is coupled directly to ground, and its collector 34 is coupled through resistor $R_{c2}$ to a source of negative potential $-E_c$. Collector 35 of transistor 33 is also coupled to source $-E_c$ through resistor $R_{c1}$. Emitter 39 of transistor 33 is coupled to collector 41 of transistor 40. Emitter 42 of transistor 40 is coupled directly to ground, and base 43 is coupled to input terminal pair 45. Transistor 46 has its collector 47 parallel coupled with collector 35 of transistor 33 to resistor $R_{c1}$, and its emitter 48 directly coupled to ground. Its base electrode 49 is coupled to input terminal pair 44.

Base 51 of transistor 50 is coupled to collector 34 of transistor 32, and collector 52 is coupled through resistor $R_{c3}$ to source $-E_c$. Emitter 53 is coupled directly to ground. The collector 52 of transistor 50 is coupled through condenser $C_d$ to the base 54 of transistor 55. Base 54 of transistor 55 is also coupled through resistor $R_d$ to source $-E_c$, and emitter 56 is coupled directly to ground. Condenser $C_d$ and resistor $R_d$ comprise a differentiating network which differentiates the output of transistor 50.

The remainder of the circuitry illustrated in FIG. 3 is a repetition of the circuitry thus far described, and the respective components are designated by corresponding primed numerals.

Figure 4:
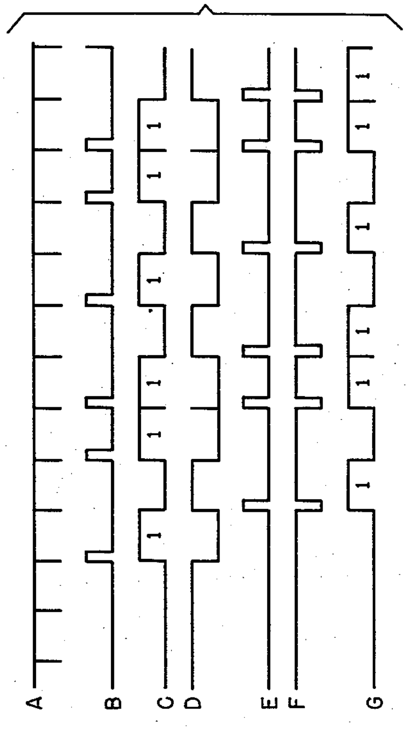
FIG. 4 is a seres of waveforms which occur at various places in the circuit of FIG. 3.

In the operation of the shifting register of FIG. 3, the resistance $R_b$ is of the correct value to allow sufficient current to flow through the emitter-base diode of transistor 40 to maintain said transistor in the normally conducting condition. The first negative shifting pulse of FIG. 4A is coupled from input terminal pair 44 to base 49 of transistor 46, causing that transistor to conduct. The collector potential of transistor 46 will then be very near ground potential and because of the direct coupling to base 36 of transistor 32 will cause transistor 32 to cut off, thus causing the collector of transistor 15 to be at a negative potential. This potential is cross-coupled to base 37 of transistor 33, and because transistor 40 is biased in a condition to normally conduct, transistor 33 will remain in the conducting condition. This is the first stable state of bistable storage element 31 and represents the storage therein of a binary zero. The coupling of the second negative pulse of waveform 4A from input terminal pair 44 to base 49 of transistor 46 will have no effect on storage element 31 since transistor 33 is already conducting, and storage element 31 will again store a binary zero.

Simultaneously with the coupling of the third negative pulse of waveform 4A to base 49 of transistor 46, the first positive pulse of waveform 4B, a binary one, is coupled from input terminal pair 45 to base 43 of transistor 40. The positive pulse to base 43 cuts off transistor 40 and creates a substantial open circuit in the conduction path from emitter 39 of transistor 33 to ground, thus causing transistor 33 to also cut off. In the well known manner, the other side of the flip-flop 31, transistor 32, then commences to conduct and the potential at its collector electrode 34 rises very close to ground potential, FIG. 4C. Bistable storage element 31 is now in its second stable state and is storing a binary one.

The fourth negative shifting pulse, FIG. 4A, is received on input terminal pair 44 and is coupled to base 49 of transistor 46, and causes transistor 46 to conduct. Since no information pulse is received on input terminal pair 45 at that time (a binary zero), the collector of transistor 46 goes very near ground potential, causing transistor 32 to cut off and transferring bistable storage element 31 to its first stable state, FIG. 4C, thus indicating that it is now storing a binary zero.

The first positive pulse thus far generated at collector 34 of transistor 32, FIG. 4C, is coupled to base 51 of transistor 50. Transistor 50 is normally conducting and is cut off by the postiive pulse of waveform 4C to produce at its collector 52 the inverted pulse of waveform 4D. This first negative pulse of FIG. 4D is differentiated by differentiating network $C_d$, $R_d$ to produce the first short positive pulse of FIG. 4E, corresponding to the trailing edge of the negative pulse of FIG. 4D. There will be no output from differentiator $C_d$, $R_d$ in response to the leading edge of the negative pulses of waveform 4D since transistor 55 is normally conducting in the saturation region, thus acting as a clamp in this respect. The short pulses of waveform 4E are coupled to base 54 of normally conducting transistor 55 and cuts off that transistor for a time duration substantially equal to the duration of the positive pulse, producing waveform 4F at collector 57. The negative pulses of waveform 4F constitue newly generated information pulses, or binary ones, which are coupled to the second bistable storage element 58 which cause storage element 58 to transfer to its second stable state in the same manner as previously discussed in the operation of bistable storage element 31.

The fifth negative pulse of waveform 4A is coupled from input terminal pair 44 to base 49′ of transistor 46′ in bistable storage element 58 and since no input pulse to that storage element is received at that time it will transfer back to its first stable state, FIG. 4G.

Simultaneously with the coupling of the fifth negative shifting pulse of waveform 4A to base 49 of transistor 46 in bistable storage element 31, a positive information pulse also is received at input terminal pair 45 and is coupled to base 43 of transistor 40. This positive pulse cuts off transistor 40 and creates a substantially open circuit in the conduction path from emitter 39 of transistor 33 to ground, and causes bistable storage element 31 to transfer to its second stable state, FIG. 4C. The sixth shifting pulse of FIG. 4A and the third information pulse of FIG. 4B are coupled simultaneously from input terminal pairs 44 and 45 to the respective bases 49 and 43 of transistors 46 and 40. In response to the simultaneous occurrence of these two pulses, bistable storage element 31 will tend to revert to its first stable state. However, because of the overriding effect of the information pulse transistor 33 will cut off and storage element 31 will immediately revert to its second stable state, FIG. 4C.

The seventh negative shifting pulse of waveform 4A is coupled to base 49 and will cause bistable storage element 31 to transfer to its first stable state since no information pulse (a binary zero) is received on input terminal pair 45 at that time. The waveform of bistable storage element 31 which results from the storage of the second and third information pulses is coupled to base 51 of transistor 50, is inverted, FIG. 4D, and differentiated by differentiating network $C_d$, $R_d$ to produce the second and third positive pulses of waveform 4E. The second and third positive pulses of waveform 4E cut off transistor 55, resulting in the second and third newly generated information pulses of FIG. 4F being produced at the collector 57 of transistor 55. The output pulses of differentiating network $C_d$, $R_d$ must be gerater in duration than a shifting pulse so that the pulses of waveform 4F will be longer in duration than the shifting pulses.

By comparing waveforms 4C and 4G it may be seen that each time bistable storage element 31 transfers from its second stable state back to its first stable state bistable storage element 58 transfers to its second stable state. This means that a binary one has been transferred from the first storage element to the second storage element.

As in the embodiment of FIG. 1, the means for transferring binary ones between stages is the pulse generating means comprised of the differentiating network $C_d$, $R_d$ and a gating means comprised of transistor 55.

Figures 5, 6:
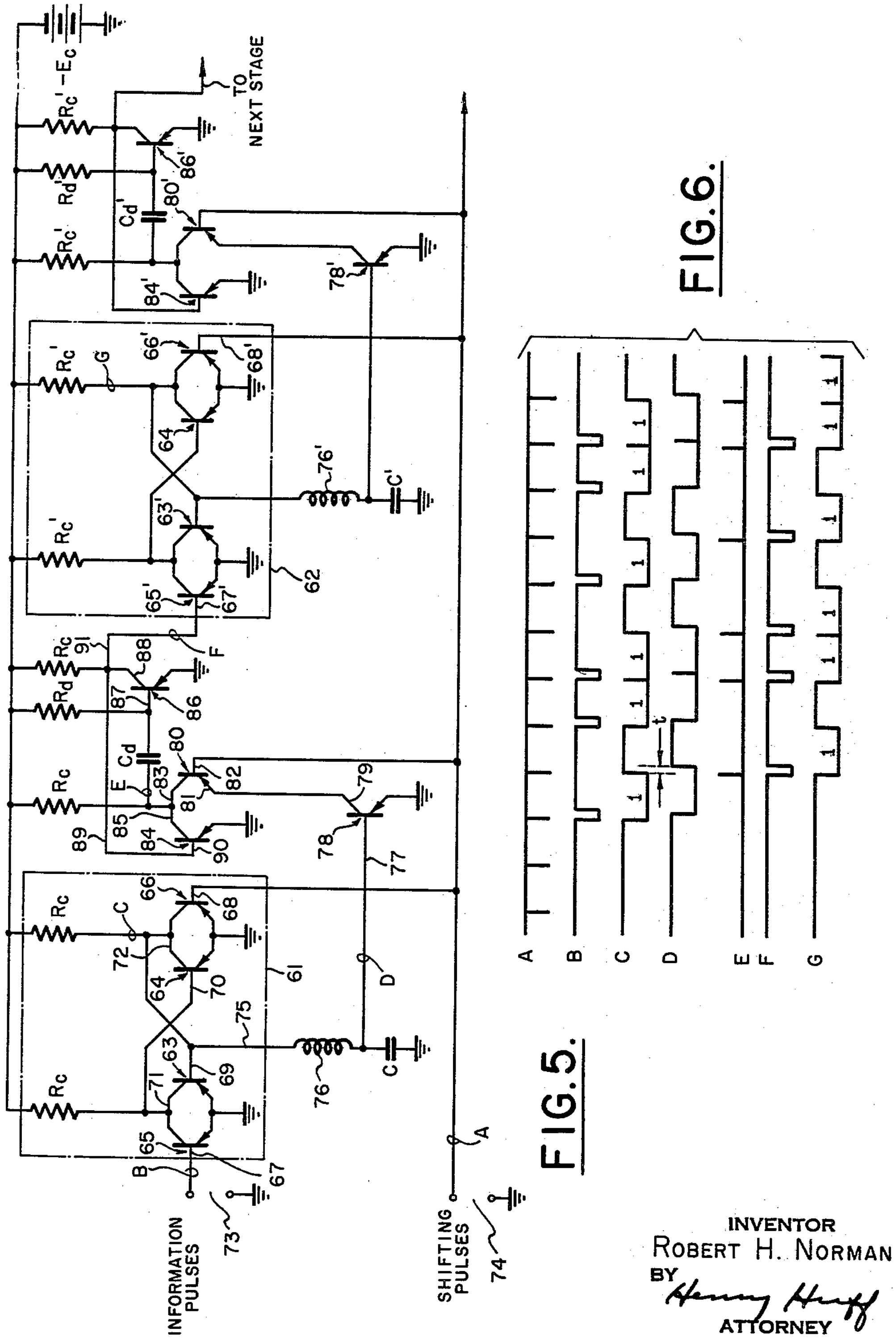
FIG. 5 is a further embodiment of the present invention.
FIG. 6 is a series of waveforms associated with the circuit of FIG. 5.

A further embodiment of the present invention is illustrated in FIG. 5 wherein two bistable storage elements comprised of flip-flop stages 61, 62 are illustrated within the broken lines.

The bistable storage elements 61 and 62 are similar in construction and operation to the storage elements 11 and 12 of FIG. 1 except that all of the resistors $R_c$ coupled between source $-E_c$ and the collectors of transistors 63—66 and 63′—66′ in FIG. 5 are of the same value and are equal to the value of resistor $R_{c1}$ in FIG. 1. For this reason they will not be further described in detail. The collector 72 of transistor 64 in storage element 61 is coupled through a lead 75 to choke coil 76, the other end of choke coil 76 being coupled through condenser C to ground. The base 77 of transistor 78 is coupled to the common terminals of choke 76 and condenser C, and the emitter of transistor 78 is grounded. Collector 79 of transistor 78 is directly coupled to the emitter 81 of transistor 80. The base 82 of transistor 80 is coupled to input terminal pair 74, and the collector electrode 83 is coupled through a resistance $R_c$ to a source of negative potential $-E_c$. The collector 85 of grounded emitter transistor 84 is also coupled through resistor $R_c$ to source $-E_c$. Collectors 83 and 85 are coupled through condenser $C_d$ to base 87 of transistor 86. Base 87 is also coupled to source $-E_c$ through resistor $R_d$. Resistor $R_d$ is of the correct value to maintain transistor 86 in a normally conducting state. Collector 88 of transistor 86 is cross-coupled to the base 90 of transistor 84. Transistors 84 and 86 therefore comprise a monostable multivibrator wherein condenser $C_d$ and resistor $R_d$ comprise the time constant network of said multivibrator. Transistors 78 and 80 comprise an and-gate input to said monostable multivibrator and couple an inverted version of a shifting pulse to condenser $C_d$ whenever a negative pulse occurs at base 77 of transistor 78 simultaneously with the occurrence of a shifting pulse at base 82 of transistor 80.

Collector 88 of transistor 86 is directly coupled by lead 91 to base 67′ of transistor 65′ in the second bistable storage element 62, and supplies newly generated information pulses to said storage element. Bistable storage element 62 and the remainder of the circuitry illustrated in FIG. 5 are identical to the corresponding components thus far described and are designated by a corresponding primed numeral.

In the operation of the shifting register of FIG. 5, the first negative shifting pulse of FIG. 6A is coupled from input terminal pair 74 to base 68 of transistor 66, causing that transistor to conduct and causing the collector potential of that transistor to rise to very near ground potential. This potential is cross-coupled to base 69 of transistor 63 to cut off that transistor. The collector potential of transistor 63 is then a negative potential which is cross-coupled to the base 70 of transistor 64 to hold that transistor in a conducting state, FIG. 6C. This is the first stable state of storage element 61, indicating the storage of a binary zero. The second negative shifting pulse of waveform 6A is coupled from input terminal pair 74 to grid 68 of transistor 66 but does not change the state of bistable storage element 61 since transistor 64 is already conducting. Therefore, storage element 61 again stores a binary zero. When the third negative shifting pulse of waveform 6A is coupled from input terminal pair 74 to base 68 of transistor 66, a negative information pulse in simultaneously coupled from input terminal pair 73 to base 67 of transistor 65. Because the information pulse at base 67 is of longer duration than the shifting pulse at base 68, the information pulse will have an overriding effect and will cause transistor 64 to cut off and transistor 63 to conduct. Bistable storage element 61 is now in its second stable state indicating that it is storing a binary one. Bistable storage element 61 will remain in this state until the fourth negative shifting pulse of waveform 6A is coupled from input terminal pair 74 to base 68 of transistor 66, at which time transistor 66 will conduct and will cause storage element 61 to transfer back to its first stable state, FIG. 6C. The first negative pulse of waveform 6C is coupled from collector 72 of transistor 64 through lead 75 to choke coil 76 which delays said pulse by a time *t* which is longer than the duration of a shifting pulse but less than the time interval between two successive shifting pulses. The first delayed pulse of waveform 6D is coupled to base 77 of transistor 78, and during the latter period of this pulse the fourth negative shifting pulse of waveform 6A is coupled from input terminal pair 74 to base 82 of transistor 80. Transistors 78 and 80 both conduct for the duration of the fourth shifting pulse and cause a positive pulse to appear at the collector 83 of transistor 80, FIG. 6E. This positive pulse triggers the monostable vibrator comprised of transistors 84, 86 and time constant circuit $C_d$, $R_d$. The monostable multivibrator operates in response thereto and produces the first negative pulse of waveform 6F. This pulse comprises a newly generated binary one and is coupled over lead 91 to base 67′ of transistor 65′ in the second bistable storage element 62. The fourth shifting pulse is simultaneously coupled to base 68′ of transistor 66′, but because of the longer duration of the pulse on base 67′, bistable storage element 62 transfers to its second stable state, FIG. 6G, thus indicating the storage of a binary one.

The second information pulse of waveform 6B and the fifth negative shifting pulse of waveform 6A are simultaneously coupled from input terminal pairs 73 and 74 to respective bases 67 and 68 of transistors 65 and 66. In the manner previously described bistable storage element 61 transfers to its second stable state, and stores the binary one. The fifth negative shifting pulse is also coupled to base 68′ of transistor 66′ of the second storage element 62, causing that storage element to transfer back to its first stable state, FIG. 6G.

The shifting register of FIG. 5 will continue to operate in the manner just described to sequentially store and then transfer to the next succeeding stage each binary one.

An inspection of waveforms 6B, 6C, 6F and 6G will reveal that each time bistable storage element 61 transfers from its second stable state to its first stable state (6C), a pulse is generated (6F) which causes the second bistable storage element 62 to transfer to its second stable state (6G). This amounts to the transfer of a binary one from one stage to the succeeding stage each time said one stage transfers from a one state to a zero state. As is true with the embodiments of FIGS. 1 and 3, signals representing a binary zero are not actually transferred between stages, the stages merely being reset to the zero state by the next shifting pulse if an information pulse is not also coupled to that stage. It will be apparent that a monostable multivibrator circuit may be employed in the embodiments of FIGS. 1 and 3 in place of the pulse generating means illustrated therein.

In a shifting register constructed in accordance with the embodiment of the invention illustrated in FIG. 1, the circuit elements had substantially the following values:

All transistors were type 2N240 manufactured by Philco Corporation.

| | | |
|---|---|---|
| Resistor $R_{c1}$ | ohms | 510 |
| Resistor $R_{c2}$—$R_{c3}$ | do | 510 |
| Resistor $R_d$ | do | 2,700 |
| Resistor $R_b$ | do | 1,800 |
| Inductance $L_d$ | millihenries | 2 |
| Condenser C | $\mu\mu$farads | 150 |
| Voltage source $-E_c$ | volts | −1.5 |

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A shifting register having at least two storage elements each comprised of first and second transistors whose respective collector electrodes are directly cross-coupled to the base electrode of the other transistor to form a bistable multivibrator circuit, each multivibrator circuit having only two input terminals and a single output terminal, means for directly coupling shifting pulses to the first one of said input terminals of each of said multivibrator circuits, means for directly coupling information pulses to the second input terminal of said first multivibrator circuit, said information pulses being longer in duration than said shifting pulses and said information pulses when present having an overlapping time relationship with said shifting pulses, each multivibrator circuit being set in a first stable state upon receiving only a shifting pulse and being set in a second stable state upon receiving a pulse on its second input terminal, means including a single differentiating circuit directly coupled to the collector electrode of the second transistor of said first multivibrator and operable in response to each change of said first multivibrator from its second stable state to its first stable state to produce a differentiated pulse having a duration substantially equal to the duration of an information pulse, and means for directly coupling substantially without delay said differentiated pulses to the second input terminal of said second multivibrator circuit to set said second multivibrator circuit in its second stable state when said first multivibrator circuit changes from its second stable state to its first stable state.

2. The combination claimed in claim 1 wherein said differentiating network is comprised of a resistor and condenser combination interposed between first and second single input gating means, the first of said gating means being a transistor whose base is directly coupled to the collector of the second transistor of said first multivibrator circuit and said second gating means is a transistor whose collector is directly coupled to the first transistor of said second multivibrator circuit.

3. The combination claimed in claim 1 wherein said differentiating network is comprised of parallel connected resistance and inductance elements directly coupled between the collector of the second transistor of said first multivibrator and a source of potential.

References Cited in the file of this patent

UNITED STATES PATENTS

| | | |
|---|---|---|
| 2,536,808 | Higinbotham | Jan. 2, 1951 |
| 2,557,186 | Hamacher | June 19, 1951 |
| 2,601,089 | Burkhart | June 17, 1952 |
| 2,825,890 | Ridler et al. | Mar. 4, 1958 |
| 2,842,682 | Clapper | July 8, 1958 |
| 2,854,589 | Ingham | Sept. 30, 1958 |
| 2,872,663 | Kelner et al. | Feb. 3, 1959 |
| 2,873,384 | Schoen et al. | Feb. 10, 1959 |
| 2,903,607 | Danner et al. | Sept. 8, 1959 |
| 2,906,892 | Jones | Sept. 29, 1959 |
| 2,954,163 | Okada | Sept. 27, 1960 |